United States Patent [19]

Durney

[11] Patent Number: 4,944,627
[45] Date of Patent: Jul. 31, 1990

[54] APPARATUS AND METHOD FOR JOINING WORKPIECES

[75] Inventor: Max W. Durney, Penngrove, Calif.

[73] Assignee: Durney/Alexander, San Francisco, Calif. ; a part interest

[21] Appl. No.: 272,444

[22] Filed: Nov. 17, 1988

[51] Int. Cl.$^5$ ................................................ B25G 3/00
[52] U.S. Cl. ............................................ 403/8; 403/10; 403/407.1
[58] Field of Search ................ 403/7, 8, 10, 231, 407.1

[56] References Cited

U.S. PATENT DOCUMENTS

| | | |
|---|---|---|
| 1,335,544 | 3/1920 | Anders . |
| 1,602,658 | 10/1926 | Germain . |
| 3,496,974 | 2/1970 | Munsil et al. . |
| 3,675,312 | 7/1972 | Herman . |
| 3,836,267 | 9/1974 | Schatz . |
| 4,089,614 | 5/1978 | Harley . |
| 4,160,610 | 7/1979 | Austen-Brown et al. . |
| 4,202,645 | 5/1980 | Giovannetti . |
| 4,236,848 | 12/1980 | Rock et al. . |
| 4,272,207 | 6/1981 | Lautenschlager . |
| 4,292,003 | 9/1981 | Pond . |
| 4,325,649 | 4/1982 | Rock . |
| 4,341,485 | 7/1982 | Appleby et al. . |
| 4,348,130 | 9/1982 | Lautenschlager . |
| 4,353,663 | 10/1982 | Glickman . |
| 4,357,119 | 11/1982 | Pollitt . |
| 4,360,282 | 11/1982 | Koch . |
| 4,361,931 | 12/1982 | Schnelle et al. . |
| 4,405,253 | 9/1983 | Stockum . |
| 4,408,923 | 10/1983 | Kubler . |
| 4,487,522 | 12/1984 | Appleby et al. . |
| 4,505,610 | 3/1985 | Rock et al. . |
| 4,545,698 | 10/1985 | Koch . |
| 4,553,873 | 11/1985 | Salice . |
| 4,559,011 | 11/1985 | Gritsuk et al. . |
| 4,564,306 | 1/1986 | Rock et al. . |
| 4,576,506 | 3/1986 | Rock et al. . |
| 4,579,474 | 4/1986 | Rock et al. . |
| 4,603,719 | 8/1986 | Durney . |
| 4,615,636 | 10/1986 | Tisbo et al. ............................ 403/8 |
| 4,634,309 | 1/1987 | Dewey . |
| 4,639,161 | 1/1987 | Mazaki . |
| 4,664,548 | 5/1987 | Brinkmann . |
| 4,669,910 | 6/1987 | Koch . |
| 4,728,215 | 3/1988 | Martincic et al. . |

FOREIGN PATENT DOCUMENTS

1449806 7/1966 France ..................................... 403/8

Primary Examiner—Andrew V. Kundrat
Attorney, Agent, or Firm—Flehr, Hohbach, Test, Albritton & Herbert

[57] ABSTRACT

A joint for ready-to assemble furniture including a mortise in a first of two workpieces, an insert for the mortise and a fastener, such as a screw for securely joining the workpieces. The fastener receiving insert has a curved front wall corresponding to a curved load-bearing face of the mortise. An insert bore penetrates the insert for receiving the fastener, and a cover cap on the insert covers the insert member and the mortise from view when two workpieces are joined. The second workpiece has a pre-drilled bore which receives the threaded end of the fastener. The fastener is screwed into threaded engagement with the pre-drilled bore in the second workpiece to securely joint the two workpieces. A plurality of embodiments of the joint and a method of joining the workpieces also are disclosed.

22 Claims, 3 Drawing Sheets

APPARATUS AND METHOD FOR JOINING WORKPIECES

TECHNICAL FIELD

The present invention relates, in general, to an apparatus and method for securely joining two workpieces at a joint and is particularly suitable for use with ready-to-assemble furniture, casework and the like. The present invention relates, more particularly, to a pocket screw mortise joint in which a mortise is provided in one workpiece and a fastener is positioned in the mortise and extends therefrom into another workpiece to securely join the two workpieces together.

BACKGROUND ART

There are many applications in joinery in which two workpieces must be secured together in such a way that the fastening elements are not visible from the outside, and sometimes the inside, of the resulting structure. One such application is in connection with ready-to-assemble or knock-down furniture and casework. Such furniture is manufactured using high-volume, wood-working production equipment and is sold to the ultimate user in a ready-to-assemble condition. A relatively unskilled purchaser must be able to assemble the components using simple and inexpensive tools into a sturdy piece of furniture.

To facilitate the assembly and alignment of parts, ready-to-assemble components sometimes include alignment dowels and mating bores. While easing the purchaser's assembly task, dowel-based ready-to-assemble furniture inherently is more expensive than ready-to-assemble furniture and casework in which the joint between components effects alignment of the components.

Ready-to-assemble furniture is often formed from particleboard or hardboard which has a wood or wood-simulating veneer or finish on one or more surfaces. Particleboard, while being a relatively inexpensive and yet strong material, has several characteristics which makes its use in ready-to-assemble furniture difficult. First, particleboard has very hard opposed surfaces, but the mechanical strength of particleboard drops rapidly in the center or away from the opposed surfaces. Second, the appearance of particleboard when cut through the surface veneer or finish is very poor.

Various types of wood-working joints have been employed in the construction of ready-to-assemble furniture. In some systems one or two fittings or inserts are mounted in the workpieces and fasteners, cams or latches used to join the fittings, and thus workpieces, together. In other systems a screw-type fastener extends from a cavity or mortise in one workpiece and is screwed into the other workpiece. Typical of the fitting-based systems are the ready-to-assemble furniture joints in which a fastener is secured to one workpiece and a fitting or insert in the other workpiece cooperates with the head of the fastener to join the two components together. Such fastening systems are shown, for example, in U.S. Pat. Nos. 4,728,215, 4,669,910, 4,579,474, 4,576,506, 4,564,306, 4,559,011, 4,553,873, 4,545,698, 4,505,610, 4,487,522, 4,408,923, 4,360,282, 4,353,663, 4,341,485 and 4,202,645. A cam or second screw is used to engage the head of the fastener and produce camming against the head of the first fastener to pull the fitting up snug against the first fastener head.

In addition to the cost and complexity of such fittings or fastening inserts, forming the joint requires at least two fastening steps, namely, orienting the camming member in the fitting to apply a force to the first fastener and applying the fastening force against the head of the first fastener. Moreover, cam-based joints inherently have the problem of having a trade-off between size and the throw or distance over which the cinching-down occurs. As the size of the cam assembly, and scar on the workpiece, decreases, the throw of the cam assembly decreases. Thus, large cam assemblies can have relatively large throws, but the small ones do not and accordingly more precision in the location of the parts must be employed. By contrast, a screw-type fastener generally can be very small in diameter with a long fastening throw.

A further serious problem which occurs with systems in which a fitting is secured to a fastener head is that the complexity of the fitting requires that a relatively large cavity or mortise be formed immediately adjacent to or abutting an edge of the workpiece, as is shown, for example, in U.S. Pat. No. 4,353,663. This cavity greatly weakens the workpiece at the fitting, particularly if particleboard is employed. The relatively low strength of particleboard in the interior volume of the board can result in breaking away of the edge weakened by the fitting receiving cavity.

Similar problems are encountered in joints of the type shown in U.S. Pat. No. 4,357,119 wherein large fittings, which snap into coupled relation, are mounted close to the edges of the workpieces.

More complex ready-to-assemble furniture joints are shown in U.S. Pat. Nos. 4,664,548 and 4,361,931 in which latch mechanisms are employed. These latches similarly have a relatively short throw during fastening, require large fittings at the edges of the workpieces and are inherently undesirably expensive.

Another approach in ready-to-assemble, fitting-based joinery is to employ two fittings with one mounted in each workpiece. The fittings interengage each other or are jointed together by a cam-acting locking member. Typical of such fittings are the assemblies of U.S. Pat. Nos. 4,348,130, 4,325,649, 4,272,207, 4,160,610 and 3,836,267. These joints, however, again are undesirably complex and require large cavities next to the edges of the components being joined.

In some joints the fastening fittings or inserts are external, that is the coupling together of the fittings is accomplished outside the volume of the workpieces being joined. Thus, a relatively small volume is required to joint each fitting to its workpiece, but the cam or snap-acting coupling structure protrudes from inside or outside of the structure, which can be unsightly and obstructive. U.S. Pat. Nos. 4,634,309 and 4,292,003 show such external joints.

Another approach which has occasionally been employed is to position the fastening fittings at a distance from the edges of the workpieces and employ long pins or bars which extend between the workpieces. U.S. Pat. Nos. 4,405,253 and 1,602,658 illustrate such furniture joints. They require, however, long bores in the workpieces and the manipulation of several pieces to effect coupling together of the furniture components.

Since cam-based fittings have various disadvantages, as above set forth, efforts also have been directed to the use of joints in which screw fasteners can be used as the basic fastening mechanism. Screw fastener-based joints have the advantage that they can employ the relatively long throw of a screw during fastening to reduce the manufacturing precision required for the joint.

In U.S. Pat. No. 4,639,161 two fittings with two screws are required to make the joint. Since the screws are mutually perpendicular, the advantage of a longer throw is minimized. Moreover, a large insert cavity or notch is required at the edge of one of the workpieces.

In U.S. Pat. Nos. 4,236,848 and 4,089,614 single screws are employed, but the fittings again must be mounted in a large recess which abuts the edge of one of the furniture components. Weakening and unsightly scarring of the workpiece results, and in U.S. Pat. No. 4,089,614 a screw-receiving fitting also is required.

The basic screw-type fastening joints are typified by U.S. Pat. Nos. 4,603,719, 3,675,312, 3,496,974, 1,602,658 and 1,335,544.

In U.S. Pat. No. 3,496,974, for example, a joint is formed using a stepped drill bit which produces a mortise and a screw receiving bore in the inner surface of a wooden member proximate an edge of the member. The mortise and the screw receiving bore are both formed at an angle with respect to the surface of the member being drilled, and the joint is generally referred to in the joinery industry as a "toe mortise" joint. A screw is inserted through the mortise and the screw receiving bore and extends outwardly of the edge of the member to permit driving of the screw into a second member. As shown in the '974 patent, the members are oriented in substantially the same plane and joined together in abutting relation. It also is possible to use this toe-fastening technique to join one member in a perpendicular orientation to another member.

Although such toe mortise joints are advantageous in many respects, one disadvantage of the method and apparatus for joining workpieces of U.S. Pat. No. 3,496,974 is the difficulty in providing a bore which is at a slight angle with respect to the surface of the workpiece. For particleboard and hardboard, as well as very hard woods, drilling at a shallow angle, even with jigs or fixtures, is almost impossible. The drill will tend to wander, be deflected toward a parallel orientation with the surface as it enters, and the drill bit may break as a result of such deflection. Moreover, the counterbore that is drilled is very often ragged and characterized by chipping.

U.S. Pat. No. 3,675,312 discloses an alternative joint forming apparatus and process for joining two members together in perpendicular relation to one another. This approach, however, also utilizes an obliquely directed access passageway and a fastener receiving bore that is parallel to the surfaces of the member. The passageway terminates in a large counterbore which is drilled into the edge of the member which will carry the screw. An annular insert having a bore for receiving a fastener is adhesively secured in the counterbore, and the access passageway is used to drive the screw into the second member.

The approach shown in the '312 patent has the disadvantage that the separate insert piece must be adhesively secured in the counterbore by a separate process. Moreover, the time and effort required to drill the necessary passageways and to fasten the members is undesirably long.

Other even more complex face-framing techniques are taught in U.S. Pat. Nos. 1,335,544 and 1,602,658.

In my U.S. Pat. No. 4,603,719, the teachings of which are incorporated by reference herein in their entirety, an improved apparatus and method for forming a mortise and counterbore are shown. This mortise joint is suitable for use in a variety of materials including hard woods, particleboard, hardboard, plastics, laminated plastics, and other substrate products, and can be used for ready-to-assemble or knock-down furniture joints.

Instead of using a drill at a shallow oblique angle, as shown in U.S. Pat. No. 3,496,974, my '719 patent teaches a method whereby a mortise is formed using a router. The router, rotating about an axis nearly perpendicular to the surface of the member being mortised, is mounted on a carriage which pivots or slides the router bit into contact with the workpiece to produce an inwardly tapered or slightly curved mortise or cavity in a surface proximate the edge of one workpiece. A fastener receiving counterbore is formed by a drill in a second operation.

In the preferred form of the '719 patent, the counterbore is drilled from an edge of the workpiece and extends inwardly to the mortise at a slight angle to the surface of the workpiece, thus producing a toe mortise joint. The same apparatus and method, however, also may be used to form a "pocket mortise" joint, that is, a joint in which the counterbore is parallel to the surfaces of the workpiece. A fastener, such as a screw, then may be inserted into the mortise and counterbore and fastened to another workpiece to securely join the workpieces in a parallel or perpendicular relationship.

If the counterbore in the '719 patented joint is at a slight angle, for example, seven degrees, to the surface in which the mortise is formed, a standard screw driver can be used to secure the two workpieces together. The toeing or slight angle of the counterbore, however, makes the alignment of the counterbore with a pre-drilled bore in the second workpiece relatively difficult, particularly in high-volume production runs. Accordingly, in the preferred form of the mortise joint of my '719 patent, self-boring fasteners are used, and a standard screw driver is used to drive the screw into an unbored second workpiece.

This use of self-boring screws is acceptable and advantageous for many applications. It has the disadvantage, however, of requiring a relatively long mortise to provide sufficient scope to enable a screwdriver to apply sufficient axial load to the screw to effect self-boring. Moreover, it is relatively difficult for an unskilled homeowner or operator to accurately hold the workpieces against movement as a unit and against relative separation or movement apart while driving the self-boring screw. Additionally, the fine pitch threads of self-boring screws require more time for the operator to drive them and result in more operator fatigue. Since self-boring screws are difficult to drive, there also is a tendency to torque down the screw too much and break out the edge of the workpiece. Since self-boring screws are relatively narrow or small in diameter, e.g., 3 millimeters, shock loading of the joints, for example, when the furniture or casework is bumped, can cause the small diameter screws to crush the lower strength cores of particleboard. This can result in a loosening and eventual failure of the joint.

If a parallel counterbore is used in my '719 patent to form a pocket mortise joint, a specialized tool, such as a screw driver having a flexible shaft, must be employed to apply sufficient axial force to the fastener to cause the screw to be self-boring. The homeowner, therefore, must be given the specialized flex-shaft tool with the ready-to-assemble kit, which also increases the cost of the resulting furniture.

Thus, prior joinery techniques have been found to require various compromises when applied to ready-to-assemble furniture. The present invention seeks to overcome these disadvantages and to provide an improved mortise joint for ready-to-assemble furniture and casework.

Accordingly, it is an objective of the present invention to provide an apparatus and method for securely fastening two workpieces together which is especially suitable for use in ready-to-assemble furniture or casework and which provides simple assembly and rapid fastening of the workpieces, requiring no specialized tools or skills.

It is another objective of the present invention to provide an apparatus and method for joining two ready-to-assemble furniture and casework components together with is adaptable to high-volume, low-cost manufacturing techniques.

Another objective of the present invention is to provide a ready-to-assemble furniture and casework joint having improved strength, reduced surface scarring and simpler parts.

Still another objective of the present invention is to provide an apparatus and method for securely fastening two workpieces at a joint in which the fastening stresses are more evenly distributed over the face of a mortise to substantially eliminate large, concentrated stresses.

A further object of the present invention is to provide a ready-to-assemble furniture joint which can be assembled in less time using simple and inexpensive tools.

The fastening joint and method of the present invention have other objectives and features which will become apparent from, or are set forth in detail in, the Best Mode of Carrying Out the Invention.

DISCLOSURE OF THE INVENTION

An apparatus and method are provided for securely joining two components or workpieces at a joint using a pocket mortise fastening technique. A pocket mortise is provided in a surface of a first workpiece in proximity to a side or terminal edge, and a fastener receiving bore extends between the mortise and the edge of the workpiece in substantially parallel relation to the surface in which the mortise is formed. The mortise preferably includes an inwardly tapered floor with side walls directed substantially perpendicular to the surface of the workpiece. The side walls terminate in a curved load-bearing face also oriented substantially perpendicular to the surface of the workpiece. The fastener receiving bore extends between the load-bearing face of the mortise and the edge of the workpiece.

The apparatus for joining workpieces according to the present invention also includes a fastener receiving insert or fitting which is mounted against the curved load-bearing face of the mortise. A fastener, such as a screw, extends through the fitting and the fastener receiving bore to project from the terminal edge of the mortised workpiece. The second component or workpiece is pre-drilled with a bore dimensioned to receive the fastener. The parallel orientation of the bore in the first workpiece enables the bore in the second workpiece to be accurately pre-drilled, and the alignment and assembly of the workpieces is easily accomplished, with the joint being completed by screwing the fastener into the pre-drilled, but untapped, bore in the second component.

The fastener receiving insert has a curved front wall corresponding to the curved load-bearing face of the mortise, and the fastener insert has a bore aligned with the bore in the first workpiece for receiving the fastener. The fastener receiving insert preferably also includes a cover cap having a configuration corresponding generally to the surface configuration of the mortise. When the fastener receiving insert is mounted in the mortise, therefore, the curved front wall of the insert member securely abuts the curved load-bearing face of the mortise, and the cover cap conceals the mortise and the insert member and the fastener from view. The cover cap may be detachable from or hinged to the fastener receiving insert to provide access to the insert member and fastener.

The method of the present invention includes the steps of forming a mortise in a first workpiece proximate an edge thereof, forming a fastener receiving bore between the mortise and the edge, positioning a fastener in the bore, and manipulating the fastener with a tool to join the first workpiece to a second workpiece by the fastener. The improvement in the method is comprised, briefly, of the steps of forming the bore parallel to the surface in which the mortise was formed, positioning a fastener receiving insert in the mortise, mounting the fastener through the insert, and prior to the manipulating step, forming a bore in the second workpiece which is aligned with the bore in the first workpiece.

The use of a pocket mortise in combination with a fastener insert or fitting and a pre-drilled bore in the second workpiece affords a ready-to-assemble furniture system which enables the user to assemble the components easily into high-strength, durable piece of furniture or casework using simple tools.

BEST MODE OF CARRYING OUT THE INVENTION

Figure 1:
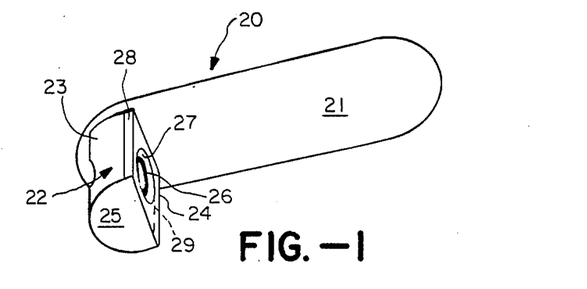
FIG. 1 shows a bottom perspective view of a fastener receiving insert according to the present invention.
Figure 2:
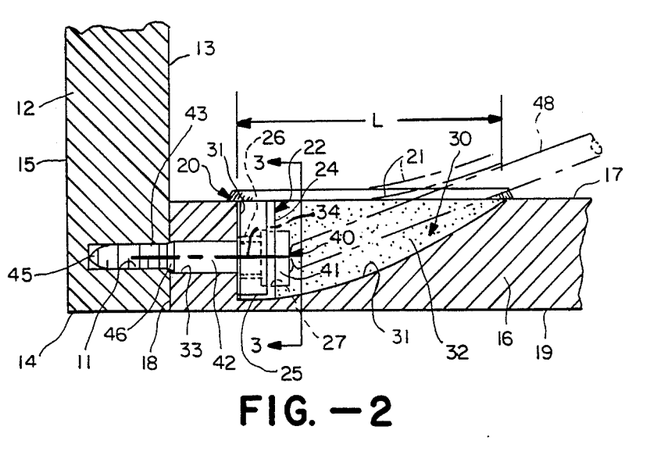
FIG. 2 shows a side elevation view in cross section through two workpieces joined by means of the fastener receiving insert shown in FIG. 1 and a fastener.

FIGS. 1–4 show a fastener receiving insert, generally designated 20, of the present invention, which insert is adapted for mounting in a mortise, generally designated 30, provided in a surface 17 of a workpiece 16. Insert 20 is used in combination with fastening means, generally designated 40, to securely join workpieces 12 and 16 at a joint, which preferably is on an inner side of the workpieces and concealed from view. The apparatus and method for joininq workpieces according to the present invention employ a pocket mortise in which the fastener receiving bore 33 is substantially parallel to surface 17, as shown most clearly in FIG. 2. Mortise 30 in FIG. 2 is formed as an inwardly tapered, curved floor 31 penetrating an inner surface 17 of workpiece 16. Two parallel side walls 32 extend substantially perpendicular to inner surface 17, and the side walls terminate in curved load-bearing face 31, which also is oriented substantially perpendicular to inner surface 17 of workpiece 16.

One advantageous method for forming pocket mortise 30 is to use a pivotally mounted router as described in my U.S. Pat. No. 4,603,719. Mortise 30 of the present invention, however, is different from the preferred toe mortise shown in the drawings of my prior patent in two important respects.

First, mortise 30 is much shorter, which may be accomplished by mounting the router on a carriage having a pivot arm which is relatively short. The short pivot arm causes arcuate surface of floor 31 to have a shorter radius, and therefore, the length, L, of the mortise can be reduced for any given mortise depth and still provide sufficient clearance to allow insertion of the screw into the mortise joint.

Second, load-bearing face 31 is now perpendicular to inner surface 17 of workpiece 16. In my prior patent the load bearing front surface of the mortise preferably was at a slight angle short of perpendicular to the surface in which the mortise was formed. This was done to insure that the load-bearing mortise surface would be perpendicular to the toe screw or inclined bore.

As will be explained in detail hereinafter, these two differences are important in enabling the present joint to be used in high-volume, ready-to assemble applications while still minimizing the scar or disfiguration of inner surface 17.

In order to facilitate coupling of members 12 and 16 together by a fastener, a fastener receiving bore 33 is provided which extends between curved load bearing face 31 of mortise 30 and side or terminal edge 18 of workpiece 16. Fastener receiving bore 33 has a longitudinal axis 34 oriented substantially parallel to inner surface 17 of workpiece 16. Bore 33, therefore, is perpendicular to face 31, and bore 33 is not a toe bore, but instead is a parallel or pocket bore.

In the preferred form fastener bore 33 in workpiece or component 16 has a diameter dimensioned to substantially mate with fastener 40, and more particularly shank 42 of the fastener. When there is not any significant clearance between bore 33 and fastener shank 42, the fastener is precisely located and can function to provide alignment between the components, as well as joining the same together. Thus, in the preferred form alignment dowels may be eliminated and screw 40 used to join and align the components.

If dowels are desired for precise alignment, some clearance can be provided between bore 33 and shank 42 to permit some inaccuracy or lack of precision in locating the pocket mortise joints.

In the toe mortise joint shown in U.S. Pat. No. 4,603,719, the fastener head which joined the two members together was positioned in direct contact with the front, load-bearing face of the mortise. This direct contact between the fastener head and the front mortise face tended to concentrate stresses immediately proximate the fastener receiving bore, and this concentration of stresses was exacerbated by the contact of the flat fastener head with the arcuate front face. When particleboard is used, the problem is compounded by the reduced strength of the particleboard in the center of the sheet of material.

Moreover, in my U.S. Pat. No. 4,603,719, the mortise and fastener were simply left exposed, presenting an undesirable visual effect proximate the joint between the two members. In many applications the scar of the mortise is not significant, but for others it is objectionable. One approach to this problem is to fill the mortise with a filler after the joint is formed, but that requires an extra, time-consuming step.

In the mortise joint of the present invention, therefore, an insert 20 is provided which spreads the loading forces more evenly over load-bearing surface 31 of the mortise and which insert most preferably includes means for covering the mortise to present a more aesthetic joint assembly. Moreover and very importantly, mortise 30 and insert 20 are dimensioned to extend to one surface of member 16 to proximate a second surface of member 16. As shown in FIG. 2, mortise 30 is formed in surface 17 and extends to a depth at load-bearing face 31 which is closely proximate outer surface 19 of member 16. Insert 20 similarly extends from surface 17 to proximate surface 19. Particleboard is formed by compression of the particles from opposing surfaces 17 and 19. The outer layers or zones next to surfaces 17 and 19 of the particleboard, therefore, tend to have significantly greater strength than the central core. By forming mortise 30 and insert 20 to extend from one surface to proximate the other, insert 20, in effect, acts as a beam which is supported in part by the high-strength zone proximate inner surface 17 and also by the high strength zone proximate surface 19. Thus, in particleboard insert 20 may be relatively thin and yet it is more than a mere washer supported only by the lower strength interior core or volume of the board. Insert 20 is a beam which picks up support from proximate inner skin 17 and outer skin 19.

Fastener receiving insert 20, as shown in FIGS. 1–4, includes a portion 22 which extends into the mortise from surface 17 and has a curved front wall 23 sized and shaped to conform to the configuration of curved load-bearing face 31. Curved front wall 23 and curved load-bearing face 31 are preferably generally hemi-cylindrical. Oppositely facing rear wall 24 of portion 22 is preferably planar and oriented at substantially right angles with respect to bottom wall 25 of the insert. When fastener receiving insert 20 is mounted in a fastening position in mortise 31, as shown in FIG. 2, bottom wall 25 is substantially parallel to inner and outer surfaces 17 and 19, respectively, of workpiece 16, while rear wall 24 and curved front wall 23 are oriented substantially perpendicular to the inner and outer surfaces.

Figure 3:
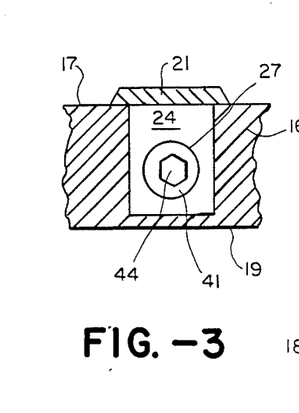
FIG. 3 shows an end view in cross section of the fastener receiving insert and fastener taken substantially along line 3—3 of FIG. 2.
Figure 4:
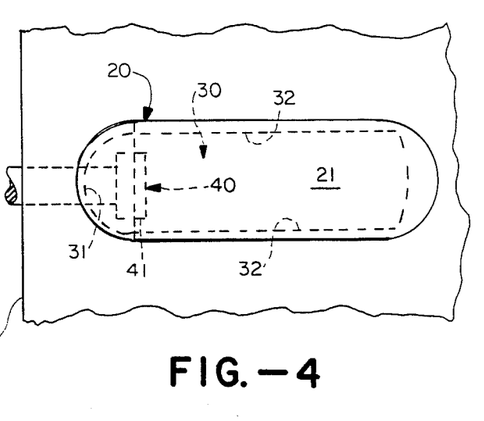
FIG. 4 shows a top plan view of the inner surface of the mortised workpiece of FIG. 2 with the fastener receiving insert and fastener mounted therein.

An insert bore 26 extends through insert portion 22, and bore 26 has a central axis aligned substantially parallel to surfaces 17 and 19 of workpiece 16, when the fastener receiving insert is mounted in the mortise. As shown in FIGS. 2 and 3, it may be desirable in many cases, depending upon the size and type of workpieces, to provide insert bore 26 in a lower portion of the insert member, i.e., closely proximate surface 25. The location of fastener receiving bore 33 in workpiece 16 dictates the location of insert bore 26. Insert bore 26 may be stepped or enlarged with a seat at 27 proximate wall 24 to accommodate an enlarged fastener head, as shown in FIG. 2. Additionally, insert bore 26 and seat 27 are preferably larger in diameter than the shank and head of the fastener positioned in the bore, as is explained below.

Although not required, portion 22 of insert 20 may advantageously include flat side faces 28 and 29, which are substantially right angles to rear wall 24 and end wall 25. Faces 28 and 29 at the edges of curved wall 23 facilitate mounting of insert member 22 in mortise 30 by avoiding a press-fit with the mortise.

In order to enhance the appearance of the joint formed by the apparatus of the present invention, fastener receiving insert 20 additionally preferably includes cover cap 21, which may be integrally formed with insert portion 22 or removably mounted to portion 22. Cover cap 21 is preferably generally oblong, as shown, and has dimensions slightly larger than, but corresponding approximately to, the dimensions of mortise 30 at inner surface 17 of workpiece 16. When fastener receiving insert 20 is fastened in place in the mortise, cover cap 21 covers the mortise and the fastening joint from view and prevents debris and the like from collecting in the mortise and fastening areas. Cover cap 21 and insert portion 22 are preferably formed as a single piece, and cover cap 21 preferably comprises a somewhat flexible material to permit a fastener driving tool access to the mortise for rotation of the fastener.

Suitable materials for fabrication of fastener receiving insert 20, such as various plastics including ABS (acrylonitrile-butadiene styrene), polyvinyl chloride, urethane, and non-plastics, such as die casting metals and the like, all of which are well known in the art. According to alternative embodiments, cover cap 21 and fastener receiving insert 22 may be provided as separate but interengageable pieces, or cover cap 21 may be hinged with respect to insert member 22 to provide the necessary tool access to the fastener means.

Figure 10:
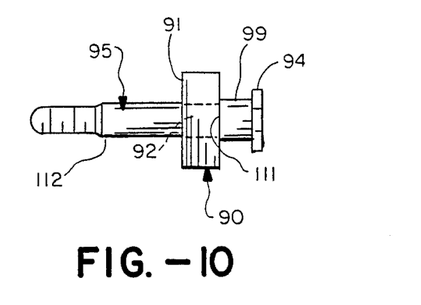
FIG. 10 shows a side view of a fastening assembly comprising a fastener mounted in the fastener receiving insert of FIG. 9.
Figure 11:
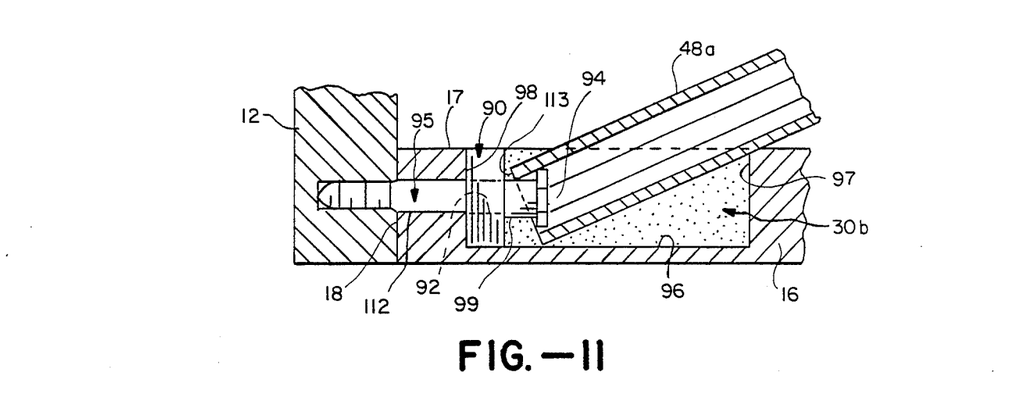
FIG. 11 shows a side elevation view in cross section through two workpieces joined by means of the fastening assembly of FIG. 10.

Fastening means 40 for use with fastening insert 20, as illustrated in FIGS. 1-4, preferably comprises a screw-type fastener having an enlarged head 41, a smooth cylindrical shank portion 42 adjacent the head, and a threaded terminal end portion 43. Euro-thread fasteners are especially preferred, since they are self-tapping, do not require internally threaded bores for fastening. Fastener head 41 is provided with tool engagement means 44, such as an allen or phillips head, or the like. Tool engagement means 44 may be recessed in head 41 or provided on the exterior of the head, as shown in FIGS. 10 and 11.

If recessed, the fastener may be rotated by a ball driver allen head tool 48. To facilitate insertion of the fastening means through insert bore 26 and fastener receiving bore 33 and into bore 11, the terminal end 45 of fastening means 40 is preferably tapered. A tapered shoulder 46 also may be provided between cylindrical shank portion 42 and threaded end portion 43.

High-volume production of knock-down or ready-to-assemble furniture requires a system which minimizes assembly time and which is sufficiently forgiving as to tolerances so as to enable mass production techniques to be employed. In the joint of my U.S. Pat. No. 4,603,719, the fastener which was preferably employed was a self-boring screw that was driven at an oblique angle. The second workpiece, or member to be joined to the mortised member, was not formed or pre-drilled with a bore to receive the self-boring screw. Thus, the length of the mortise in U.S. Pat. No. 4,603,719 had to be relatively long to provide sufficient scope for a screwdriver, or similar tool, to be axially aligned with the screw to apply sufficient axial force to the self-boring screw to drive the same into an unbored second workpiece.

The preferred slight angle, seven degrees, of the toe fastener bore in my U.S. Pat. No. 4,603,719 with respect to the surface in which the mortise is formed made the pre-drilling of bores in the second workpiece impractical. The slightly skewed axis of such a bore makes it very difficult to reproducibly locate inclined bores in the second workpiece.

In the pocket mortise joint of the present invention, axis 34 of fastener receiving bore 33 is parallel to surfaces 17 and 19. This orientation enables a bore 11 to be formed in second workpiece 12, which is perpendicular to surface 13. It is relatively easy using line boring techniques to precisely locate and pre-drill bore 11 perpendicular to surface 13 at a predetermined distance from the edge 14 of member 12.

While conventional line boring techniques can be used to precisely locate bore 11 in the second workpiece with bore 33 in the first workpiece, it is a more difficult task to index or precisely align the center of mortise 30 with the center of bore 33. In high production, mortise 30 and bore 33 most probably will be formed at two separate stations by two different machines, instead of using a single pivotal or slide carriage, as described and shown in U.S. Pat. No. 4,603,719. Thus, bore 33 may not be precisely aligned with mortise 30 and, accordingly, may not be precisely aligned with insert bore 26 in fastener fitting or insert 20. For this reason, insert bore 26 and seat 27 in fitting 20 are preferably oversized with respect to fastener shank 42 and head 41. This permits sufficient tolerance between the parts to accommodate production misalignment of mortise 30 and bore 33.

Bore 11 in second component 12 of the joint is pre-drilled at a diameter about equal to the root diameter of threaded end 43 of the fastener. Bore 11 is drilled, but not tapped. Thus, the threads on end 43 must tap the material as the fastener is rotated, which firmly secures and locates the fastener in axial alignment with bore 11. Bore 33 will be aligned by fastener shank 42 with bore 11 (assuming bore 33 is the same size as shank 42 and no alignment dowels are used), and oversized insert bore 26 and seat 27 allow the necessary adjustment between the fastener and the insert to accommodate any mortise 30 and bore 33 misalignment.

At least three important advantages result from pre-drilling bore 11. First, alignment and assembly of the joint is easier. Second, the length of mortise, L, can be relatively short. Third, a larger diameter fastener can be used to produce a joint that is stronger in shear and tension.

With respect to assembly, portion 22 of fastener receiving insert 20 is first mounted in abutting contact with curved load bearing face 31 of mortise 30. Fastening means 40 is inserted into insert bore 26 until enlarged head 41 seats in seat 27, at which point cylindrical shank portion 42 extends through fastener bore 33 and threaded terminal end portion 43 extends from edge 18 of workpiece 16. Second workpiece 12 can then be positioned for insertion of tapered end 45 of fastener 40 into bore 11, and a fastener rotating tool, such as an allen head screwdriver 48 having a ball or universal head, can be used to rotate the fastener and screw the fastener into bore 11.

Because bore 11 is pre-drilled, rotation of the fastener does not need to be accompanied by the application of a high axial force. This will allow assembly without the need for assembly clamps, jigs or fixtures and generally reduces the set-up and assembly time. Moreover and very importantly, tool 48 does not have to be oriented coaxially with fastener 40 during rotation of the fastener. Thus, as may be seen in FIG. 2, tool 48 may be upwardly inclined and length L of mortise 30 can be much shorter than is possible if the tool and fastener are axially aligned to drive self-boring screws. The cover cap permits withdrawal of the ball driver 48 from the mortise after the workpieces are securely joined, and the cover cap then returns to its position abutting surface 17 of workpiece 16 to hide the mortise and fastener.

Figure 9:
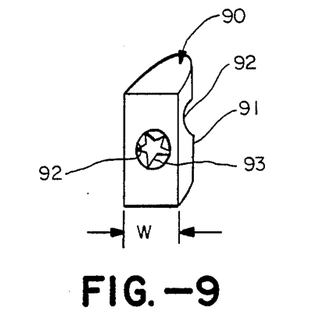
FIG. 9 shows a rear perspective view of another embodiment of a fastener receiving insert according to the present invention.

Although fastener 40 is illustrated as a conventional Euro-thread type fastener, less conventional screws, such as the fastener of FIGS. 9 and 10, and devices other than screws may be utilized. A bayonet fastening device might be employed, for example, but bore 11 would then have to be cooperatively formed or provided with an insert. Fasteners with threaded ends, however, are believed to be the most advantageous in many respects. Bayonet and cam fasteners have a relatively short throw. Thus, they move only over a relatively short distance between fully coupled and fully uncoupled conditions. This means that greater precision is required in their mounting to furniture components than is required for conventional screws, which have a long throw. Similarly, other types of tool ends and fastener heads 41 may be utilized, and are well known in the art.

Figure 5:
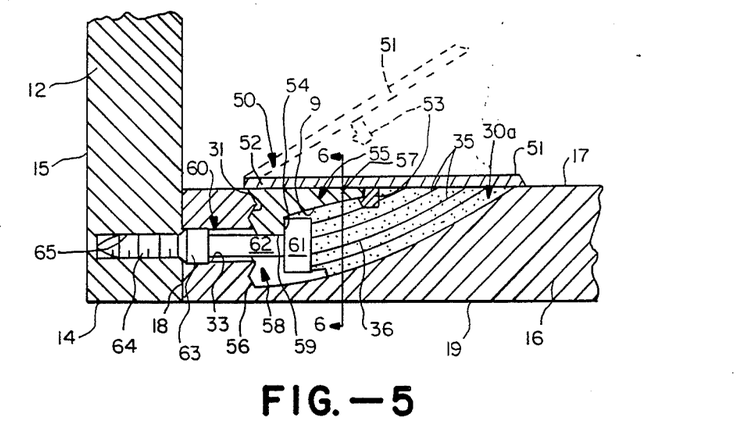
FIG. 5 shows a side elevation view in cross section through two workpieces joined by means of another embodiment of the fastener receiving insert according to the present invention in combination with a fastener.
Figure 6:
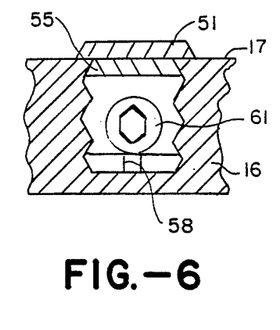
FIG. 6 shows an end view in cross section of the fastener receiving insert and fastener mounted in a mortise, taken substantially along line 6-6 of FIG. 5.

FIGS. 5 and 6 illustrate another embodiment of the pocket mortise joint according to the present invention. As shown in FIG. 5, mortise 30a provided in workpiece 16 is substantially similar in configuration and placement to mortise 30 shown in FIGS. 1"4, but the side walls and curved load-bearing face of the mortise are provided with parallel serrations or ridges 35 and valleys 36. A serrated mortise of this type may be provided using a serrated router bit with apparatus and methods which are known to the art, and, for example, are taught in my U.S. Pat. No. 4,603,719. Also, as shown in FIG. 5, fastener receiving bore 33 provided in workpiece 16 also is sized to have a diameter slightly smaller than the diameter of shank portion 63 of fastener 60.

Fastener receiving insert 50, as shown in FIGS. 5 and 6, includes cover cap 51 hinged to insert portion 55 along hinge joint 52. Cover cap 51 is rotatable about hinge joint 52 between a closed position (shown in solid lines), wherein its peripheral edge abuts inner surface 17 of workpiece 16, and an open position (shown in broken lines) permitting access to the mortise. Insert portion 55 has curved front wall 56 which is provided with serrations complementary to serrations 35,36 on the mortise walls, so that insert member 55 is securely held in the mortise and the overall joint strength is improved.

Generally circular recessed seat portion 54 in insert portion 55 is provided with an insert bore 59 extending therethrough. Insert portion 55 also includes an upper extension 57 having angled inner wall 69 which tapers from inner surface 17 of workpiece 16 toward curved front wall 56. In order to facilitate pre-assembly of fastener 60 and insert 50 together as a unit, a slot 58 (FIG. 6) is provided in a central lower region of insert portion 55. Slot 58 is dimensioned to resiliently spread apart to receive neck 62 of the fastener and then snap back around the neck when it reaches bore 59. A hinged cover cap 51 is mounted to insert 50, and when it is in the closed position, extension 57 serves as a detent for latch projection 53 depending downwardly from the lower surface of cover cap 51. This latch assembly releasably locks the cover cap in a closed position to hide the mortise.

Screw fastener 60, for use with fastener receiving insert 50, includes enlarged head 61, reduced diameter neck portion 62, enlarged diameter shank portion 63, and threaded end portion 64. During the fastening process, screw fastener 60 is mounted to insert portion 55 through slot 58 until enlarged head 61 is seated against recessed seat portion 54. When the pre-assembled fastener receiving insert 50 and screw fastener 60 are mounted in the mortise of a workpiece, enlarged diameter shank portion 63 is positioned in fastener receiving bore 33, and threaded end portion 64 of the screw fastener projects from the terminal edge of the workpiece. Threaded end 64 of the screw fastener is screwed into a pre-drilled bore 65 in second workpiece 12. The relatively short large diameter shank portion 63 and long neck 62 enables manipulation of the fitting and fastener during insertion of shank 63 into interference fit bore 33.

Figure 7:
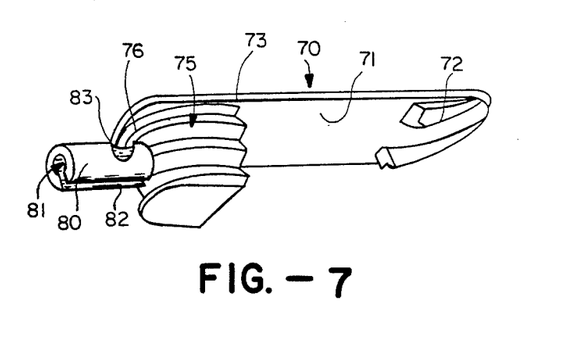
FIG. 7 shows a bottom perspective view of another embodiment of a fastener receiving insert according to the present invention.
Figure 8:
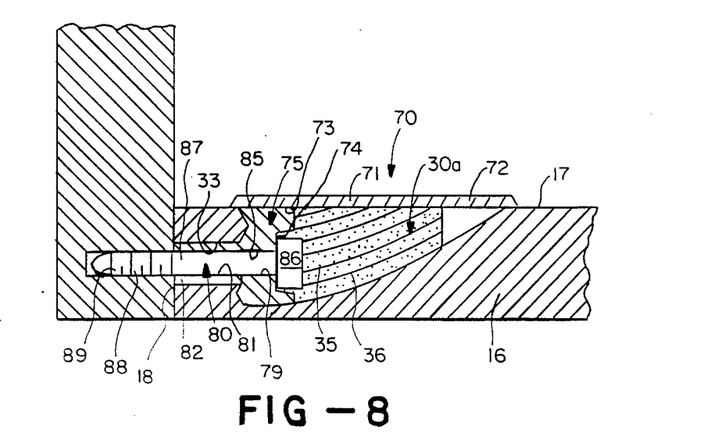
FIG. 8 shows a side elevation view in cross section through two workpieces joined by means of the fastener receiving insert shown in FIG. 7 in combination with a screw-type fastener.

FIGS. 7 and 8 illustrate yet another embodiment of a fastener receiving insert and corresponding fastening means according to the present invention. The pocket mortise and fastener receiving bore provided in workpiece 16 is substantially the same as described above with reference to FIGS. 5 and 6.

As shown in FIG. 7, fastener receiving insert 70 includes cover cap 71 operatively mounted to insert portion 75. Insert portion 75 has curved front wall 76 which is provided with serrations complementary to serrations 35, 36 on the mortise walls, so that the insert member is securely engaged in the mortise. Generally circular recessed seat portion 74 is provided with insert bore 79 extending therethrough and having a central axis aligned substantially parallel to inner surface 17 of workpiece 16. Tubular extension 80 is provided on insert portion 75 and has a central bore 81 therein aligned with insert bore 79. Tubular section 80 preferably has a longitudinally extending slot 82 and/or an aperture or transverse notch 83 penetrating its cylindrical wall to provide increased radial and longitudinal flexibility to the tubular section. Such flexibility facilitates insertion of extension 80 into bore 33 in which it is mounted and accommodates misalignment of bore and pocket.

Cover cap 71 has dimensions corresponding approximately to those of the mortise at the inner surface of the workpiece, and it is preferably rotatable between an opened and closed position about hinge joint 73. As shown in FIG. 7, downwardly depending serrated latch portions 72 are preferably provided on the interior surface of cover cap 71 at the end opposite insert portion 75. Serrated latch portions 72 securely, but releasably, fasten the cover cap in a closed position by engaging serrations 35, 36. It will be appreciated, however, that latch portions 72 can be used with a smooth walled mortise proVided that the portions 72 extend laterally for a sufficient distance to be in an interference fit with the opposite side walls of the mortise.

Screw fastener 85, for use with fastener receiving insert 70, includes enlarged head 86, reduced diameter shank portion 87 and threaded end portion 88. During the fastening process, fastener receiving insert 70 is positioned in the mortise as shown in FIG. 8, with cylindrical extension 80 positioned in fastener receiving bore 33. Screw fastener 85 is inserted through insert member 75 until enlarged head 81 is seated against recessed seat portion 74. Shank portion 87 penetrates central bore 81 of cylindrical extension 80, while threaded terminal portion 88 projects from terminal edge 18 of workpiece 16 for fastening in a pre-drilled bore 89 in second workpiece 12. Slot 82 allows lateral expansion of extension 80 into interference or compression fit with bore 33 as the screw shank is pressed down bore 81. This helps strengthen the joint proximate edge 18 by slightly compressing member 16 around bore 33, and increases the diameter which supports shock loads at the joint.

FIGS. 9–11 illustrate yet another embodiment of the fastener receiving insert of the present invention. Insert member 90 is similar in configuration to insert portion 22 of fastener receiving insert 20, but it has been significantly reduced in width. Curved front wall 91 substantially mates with a curved load-bearing face of mortise 30b, and insert bore 92 penetrates insert member 90 for receiving a fastening means therethrough. The width, W, of insert 90 is slightly larger than insert bore 92, and bore 92 is preferably centrally located in the body of member 90 so that the insert member may be positioned in the mortise in either one of two orientations rotated by 180°.

Reduction of the width W of insert 90 to substantially less than its depth dimension can be accomplished because the insert extends from inner surface 17 of member 16 to proximate outer surface 19. This is particularly important for particleboard in that insert 90 acts as a beam supported in part from the higher strength regions adjacent surfaces 17 and 19.

The limitation in reduction of width W depends upon the diameter of the fastener manipulating tool. If a tool 48a is used to engage the outside of head 94 on fastener 95, as shown in FIG. 11, the mortise width and fitting width W will have to be selected to allow sufficient clearance to permit rotation of the tool. If a tool is used that engages an internal structure on the head of the fastener, such as tool 48 in FIG. 2, the diameter of the head of the fastener determines width W.

It is desirable to reduce the width of insert 90 and mortise 30b in order that scarring of the surface 17 is minimized. Additionally, the lower the volume of the mortise, the less the reduction in the strength of the workpiece adjacent to edge 18 caused by the mortise cavity. It also should be noted that the arcuate load-bearing faces of all of the pocket mortises of the present invention have the advantage of having the area of the cavity or mortise decrease progressively as the mortise nears the edge of the workpiece. Thus, the mortise is set inwardly from the terminal edge of the workpiece and the closest portion of the mortise to the edge is the relatively narrow front (theoretically a line) of the arcuate load-bearing face.

In order to facilitate pre-assembly of insert member 90 and fastener 95, retaining means, such as tabs 93 projecting into insert bore 92, are provided. Once fastening means 95 has been positioned in fastener bore 92, retaining tabs 93 hold it in place, for example, during placement of the insert member in the mortise. This embodiment speeds assembly of the fastening joint and prevents the fastening components from being separated or lost during shipping or assembly. Alternatively, a thin membrane can be provided in bore 92 as retention means. The membrane can be frangible to allow fastener 95 to be forced therethrough or provided with an interference-fit bore.

FIG. 11 shows the fastening assembly of FIG. 10 mounted in a mortise 30b in first workpiece 16, which is fastened securely to a second workpiece 12. FIG. 11 also illustrates the utilization of a mortise 30b similar to those described above, except that the floor or bottom surface 96 is generally parallel to surfaces 17 and 19, rather than curved as shown in the previously described embodiments. Mortise 30b also has an additional mortise end wall 97 opposite the curved load-bearing face 98. Although a mortise having a curved or tapered floor is preferred, mortises having different configurations may be utilized as long as a load-bearing face is provided at the fastening end of the mortise and there is sufficient length to insert a fastener manipulating tool into the mortise. Mortise 30b can be formed, for example, using a slot mortise forming machine, and it will be appreciated that the inserts of FIGS. 1–8 and 12 also can be used in mortise 30b Since slot mortise forming equipment will not easily form a serrated mortise, the serrated inserts normally would not be used, but they could be press-fit into a smooth-walled mortise.

The pocket mortise joint of FIG. 11 further illustrates a fastener 95 and fastener rotating tool 48a which are particularly well suited for use by unskilled personnel. Fastener 95 has an enlarged head 94, here shown as a hex-head. A slightly reduced shank portion 99 extends away from head 94 to shoulder 111. In the form shown in the drawing shank portion 99 has a diameter greater than insert bore 92 to cause shoulder 111 to engage the body of insert 90 around bore 92. Extending from shoulder 111 is shank portion 112 which is smaller in diameter than shank portion 99 and is dimensioned to extend through insert bore 92.

Alternatively, fastener 90 can be a conventional small diameter, e.g., 3 millimeter screw. Insert 91 can include a stand-off 99 in the form of a sleeve or collar extending from front surface 120 of insert 90. The head 94 of the fastener would simply bear upon stand-off collar 99 on the insert. If a 3 millimeter screw is used the insert also preferably would include a nose or tubular extension from the front side of the insert (e.g., as shown at 80 in FIG. 7). This would increase the shock loading capacity of the joint.

As best may be seen in FIG. 11, a hollow tool 48a is inserted over hex-head 94. Tool 48a, therefore, must have a hexagonal bore dimensioned to slide over head 94 at an angle, as shown in FIG. 11. Forming head 94 with a relatively short dimension along the longitudinal axis of fastener 95, as well as longitudinally rounding the corners of the hex-head and rounding somewhat the interior corners of the tool, in effect provides a universal fastener head-tool combination which allows rotation of the fastener while the tool is at an angle to the fastener. Shank portion 99 provides an undercut from the head and a stand-off for the head from the fitting which accommodates the inwardly tilted end 113 of tool 48a. Moreover, and very importantly, tool 48a can be formed from inexpensive hex-tubing which is cut to length and provided with the ready-to-assemble furniture components as a throw-away tool. The end of tool 48a remote of the fastener can be gripped by pliers or a wrench or formed with transverse openings to receive a torque applying member, such as a nail or screwdriver. Substantial axial force is not required to screw in fastener 95, but the fastener also can be provided with an outwardly projecting flange (not shown) proximate shoulder 111 to allow the end 113 of tool 48a to apply some axial force to the fastener.

Figure 12:
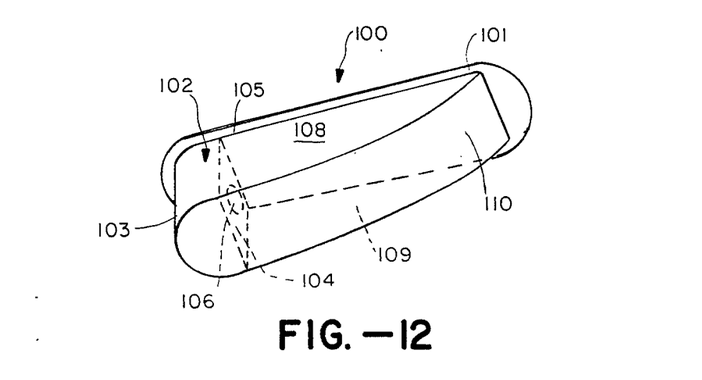
FIG. 12 shows a bottom perspective view of another embodiment of a fastener receiving insert according to the present invention.

FIG. 12 shows still another embodiment of the fastener receiving insert of the present invention. Fastener receiving insert 100 has an insert portion 102 which extends into the pocket mortise. A curved load-bearing wall 103 and an oppositely facing wall 104 are provided on insert portion 102. Penetrating portion 102 is a fastener receiving bore 106. Cover cap 101 is carried by insert member 102 and is rotatable about hinge axis 105 between a closed and an open position. In addition, fastener receiving insert 100 is provided with parallel side walls 108 and 109, corresponding to the side walls of the mortise, and a tapered bottom wall 110.

When fastener receiving insert 100 is positioned in a suitable mortise, the mortise side and bottom walls are not visible. This embodiment of the fastener receiving insert of the present invention is especially suitable for use in applications where the workpieces comprise veneer applied to a base material, such as particleboard, which is less desirable in appearance. Using fastener receiving insert 100, the base material will not be visible unless the entire insert is removed from the mortise.

The joint forming method of the present invention includes several steps found in the mortise joint forming method of my U.S. Pat. No. 4,603,719. While described in connection with the form of joint shown in FIGS. 1-4, it will be understood to be applicable to each embodiment shown in the drawing. Thus, a mortise 30 is formed in a first of two workpieces 12 and 16 which are to be joined together. A fastener receiving bore 33 also is formed between the mortise and an edge 18 of first workpiece 16, and fastener means 40 is positioned to extend from the mortise through the bore to the second component or workpiece 12. In my prior method the fastener was a self-boring screw which was driven by a tool into the second workpiece to effect joining of the two workpieces.

In the improved method of the present invention, during the step of forming fastener receiving bore 33, the bore is formed in an orientation substantially parallel to surface 17 of the first workpiece. This orientation of bore 33 enables the second workpiece to be accurately pre-drilled or formed with an untapped bore 11 dimensioned for receipt and interengagement with a threaded end 43 of fastener 40. Moreover, in order to better distribute the stress forces, the present method includes the steps of positioning a fastener receiving insert 20 into mortise 30 at a load-bearing face 31 of the mortise and inserting fastener 40 through insert 20, through bore 33, and into bore 11 in the second member. A tool can then be used to rotate the fastener, which will screw itself into bore 11 with little axial force being required to couple the two members together.

This method enables mass production of ready-to-assemble furniture and facilitates easy assembly by unskilled users employing a simple tool. The resultant joint has greater strength, because larger fasteners can be used, and the stress on the mortise is more evenly distributed. Moreover, the mortise size is minimized to reduce scarring and a cover for the mortise can be provided.

Although workpieces 12 and 16 are illustrated in the figures fastened in a perpendicular alignment with respect to one another, with terminal edge 14 of workpiece 12 flush with outer surface 19 of workpiece 16, the apparatus and method of the present invention are applicable to various other joints. Likewise, although many specific features have been described in conjunction with specific preferred embodiments, it will be recognized by one skilled in the art that many of the features may be utilized in various combinations to provide a variety of fastening arrangements. It will be apparent to those skilled in the art that the invention is susceptible to additional embodiments and that certain of the details described herein can be varied considerably without departing from the basic principles of the invention.

What is claimed is:

1. In apparatus for securely fastening a first workpiece to a second workpiece, said apparatus including a mortise formed in a surface of said first workpiece with a load-bearing face of said mortise oriented substantially perpendicular to said surface, a fastener receiving bore extending between said load-bearing face of said mortise and an edge of said first workpiece, a fastener receiving insert member including an insert portion having a front wall mating with said load-bearing face of said mortise and an insert bore aligned with said fastener receiving bore, and fastening means mounted in said insert bore and in said fastener receiving bore, said fastening means including an end portion having attachment means thereon for fastening to said second workpiece the improvement in said apparatus comprising:
   said insert portion surrounding said insert bore to provide a seat supporting said fastening means completely around said insert bore; and
   said mortise, insert member and fastening means are dimensioned for insertion of both said insert member and said fastening means into said mortise from said surface in said first workpiece having said mortise formed therein.

2. In an apparatus for securely fastening a first workpiece to a second workpiece, said apparatus including a mortise formed in a surface of said first workpiece with a load-bearing face of said mortise oriented substantially perpendicular to said surface, a fastener receiving bore extending between said load-bearing face of said mortise and an edge of said first workpiece, a fastener receiving insert member including an insert portion having a front wall mating with said load-bearing face of said mortise and an insert bore aligned with said fastener receiving bore, and fastening means mounted in said insert bore and in said fastener receiving bore, said fastening means including an end portion having attachment means thereon for fastening to said second workpiece, the improvement in said apparatus comprising:
   a cover cap mounted to said insert member and said cover cap and said insert member are formed as a single piece and said cover cap is flexible.

3. An apparatus according to claim 1, and
   a cover cap mounted to said insert member and having a configuration generally corresponding to the surface configuration of said mortise; and said cover cap being rotatable about a hinge axis between a closed position wherein its peripheral edge abuts said surface of first workpiece and an open position providing access to said insert portion.

4. An apparatus according to claim 1 wherein said fastening means is a screw-type fastener and has an enlarged head formed for the application of torque to exterior surfaces thereof and a shank portion radially recessed from said head and including a shoulder engaging said insert portion to position said head at an axially spaced distance from said insert portion.

5. An apparatus according to claim 1, wherein said load-bearing wall is curved, said insert portion has a curved front wall and a generally planar rear wall extending between peripheral edges of said curved front wall, said planar rear wall is generally perpendicular to a longitudinal axis of said insert bore and said seat and said insert bore are formed for displacement of said fastening means transversely in said insert bore while said fastening means is oriented parallel to the central axis of said insert bore.

6. An apparatus according to claim 5, wherein said fastening means has an enlarged head portion, and said seat is provided by an enlarged diameter bore in the surface of said planar rear wall, which enlarged diameter bore is aligned with said insert bore for securely seating said enlarged head portion of said fastening means.

7. An apparatus according to claim 5, wherein parallel side faces are provided at edges of said curved front wall adjacent said planar rear wall, and are oriented substantially perpendicular to said planar rear wall.

8. An apparatus according to claim 1, wherein said front wall of said insert portion surrounding said insert bore is provided with parallel serrations defining a plurality of ridges and valleys.

9. An apparatus according to claim 3, wherein a detent is carried by an upper portion of said insert portion, a projection is mounted on a lower surface of said cover cap, and said projection releasably locks with said detent in a closed position of said cover cap.

10. An apparatus according to claim 3, and latch means mounted on an interior surface of said cover cap at an end of said cover cap opposite said insert portion to releasably hold said cover cap in a closed position.

11. An apparatus according to claim 1, wherein said fastener means includes an enlarged head portion, a reduced diameter shank portion adjacent said enlarged head sized to fit loosely in said insert bore, and a shank portion adjacent said reduced diameter shank portion sized to fit snugly in said fastener receiving bore.

12. An apparatus according to claim 1, wherein said insert portion includes a tubular section having a central bore therein extending from said front wall of said insert portion, said central bore of said tubular section substantially corresponding in diameter to and aligned with said insert bore in said insert member.

13. An apparatus according to claim 12, wherein said tubular section is provided with a transverse notch proximate said front wall.

14. An apparatus according to claim 12, wherein said tubular section is provided with a longitudinally extending slot extending from proximate said front wall to a distal end of said tubular section.

15. An apparatus according to claim 2, wherein said insert portion is formed with two parallel side walls extending substantially over the length of said mortise, and a bottom wall connecting said side walls, said insert portion, said side walls, said bottom wall and said cover cap enclosing an interior volume inside said mortise.

16. In an apparatus for securely fastening a first workpiece to a second workpiece, a fastener receiving insert having a curved front wall an opposite rear wall oriented substantially parallel to said front wall, and an end wall connecting said front wall and said rear wall, and an insert bore having a longitudinal axis substantially perpendicular to said front wall and said rear wall, the improvement in said apparatus comprising:
said insert bore having retention means positioned therein, and
fastening means mounted through said insert bore and retained therein by said retention means.

17. An apparatus according to claim 16, wherein said retention means is provided by a plurality of tabs extending into said insert bore and gripping said fastening means.

18. A kit for forming ready-to-assemble article of furniture or casework comprising:
a first component of said article of furniture having a pocket mortise formed in a surface thereof with a load-bearing face proximate and inwardly of an edge of said first component, said first component having a fastener receiving bore formed therein and extending substantially parallel to said surface from said edge to said load-bearing face;
a second component of said article of furniture having a bore formed therein dimensioned for threaded interengagement of a threaded end of a fastener and oriented for alignment with said fastener receiving bore in said first component;
an insert member having a front wall formed for mating engagement with said load-bearing face of said mortise, said insert member being formed with an insert bore dimensioned for receipt of a fastener therethrough and positioned for alignment with said fastener receiving bore;
a fastener having a threaded end dimensioned to pass through said insert bore and said fastener receiving bore and to extend into said bore in said second component by a distance sufficient to threadably secure said fastener therein; and
said pocket mortise having sufficient length to enable insertion of said fastener into said insert bore and said fastener receiving bore from said mortise.

19. The kit as defined in claim 18, wherein
said fastener means includes a head formed for the application of a torque force to external surfaces thereof; and
said kit further includes a tool dimensioned to receive said head in an end thereof.

20. The kit as defined in claim 19 wherein said tool is formed from a tube having a polygonal bore therein.

21. The kit as defined in claim 19 wherein, one of said insert member and said fastener includes a stand-off portion formed with a shoulder which maintains said head at a spaced distance from said insert member, said stand-off portion being radially recessed from said head portion sufficiently to provide clearance for an end of said tool when rotating said fastener while at an angle to said fastener.

22. A method for joining together two workpieces including the steps of forming a mortise with a load-bearing face in a surface of a first workpiece proximate an edge thereof, forming a fastener receiving bore between said load-bearing face and said edge, positioning a fastener having an enlarged head and a fastening end in said fastener receiving bore with said end extending beyond said edge, and manipulating said fastener to join said end to a second workpiece, wherein the improvement in said method comprises the steps of:

during said step of forming said fastener receiving bore, forming said fastener receiving bore in an orientation substantially parallel to said surface;

positioning a fastener receiving insert having an insert bore therethrough and a seat completely surrounding said insert bore in said mortise in engagement with said load-bearing face;

inserting said fastener through said insert bore prior to positioning said fastener into said fastener receiving bore in said first workpiece; and     prior to said manipulating step, forming a bore in said second workpiece dimensioned for receipt and interengagement with said end of said fastener.

* * * * *